Jan. 12, 1971  R. A. MYERS ET AL  3,555,454
ELECTRON BEAM ADDRESSED DIGITAL SCANLASER
Filed July 15, 1968  2 Sheets-Sheet 1
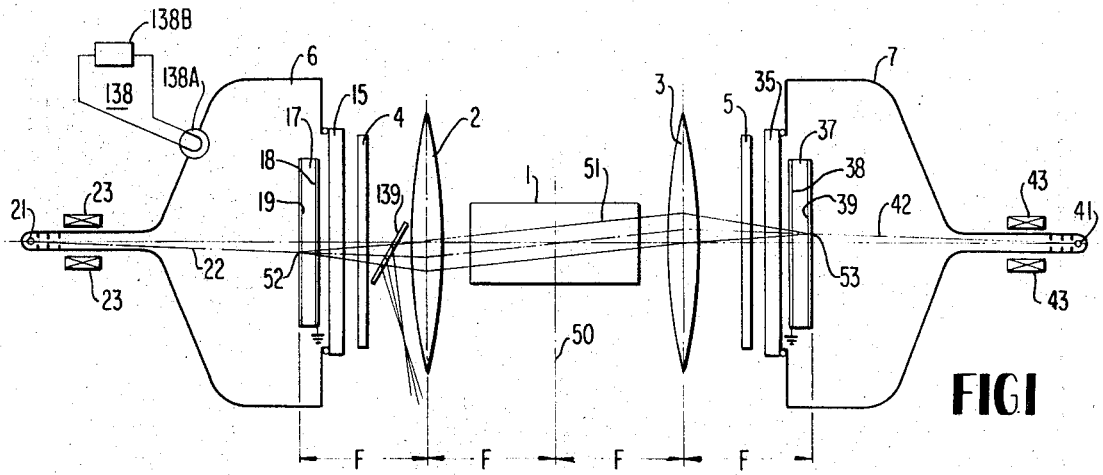
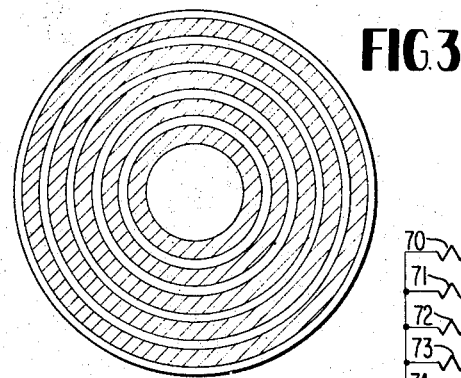
FIG.3
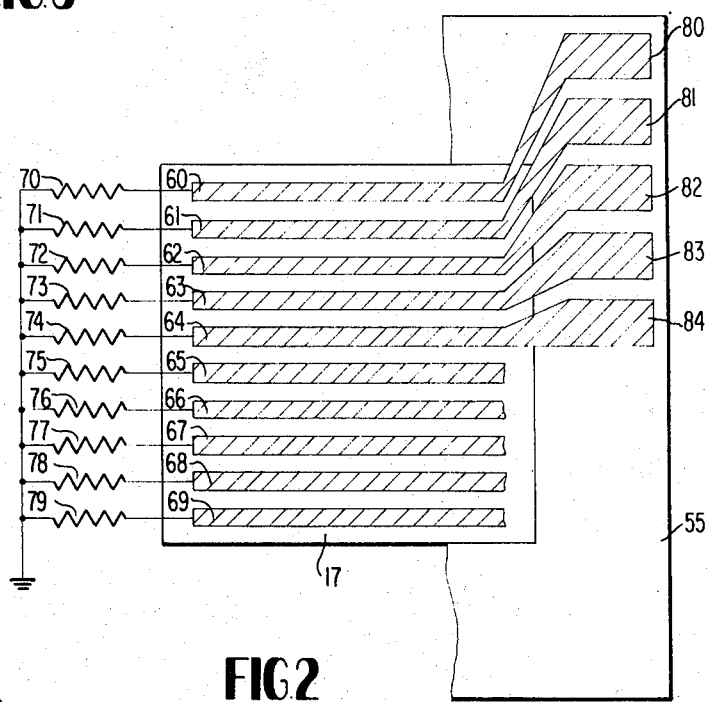
FIG.2
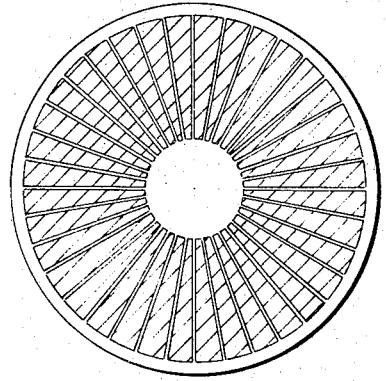
FIG.4
INVENTORS
ROBERT A. MYERS
ROBERT V. POLE
BY *signature*
ATTORNEYS

# United States Patent Office 3,555,454
Patented Jan. 12, 1971

3,555,454
ELECTRON BEAM ADDRESSED DIGITAL SCANLASER
Robert A. Myers, New York, and Robert V. Pole, Yorktown Heights, N.Y., assignors to International Business Machines Corporation, Armonk, N.Y., a corporation of New York
Filed July 15, 1968, Ser. No. 745,003
Int. Cl. H01s 3/02
U.S. Cl. 331—94.5             13 Claims

ABSTRACT OF THE DISCLOSURE

A scanlaser is a device for emitting a beam of coherent, laser radiation from a desired point or at a controlled angle of deflection. An optical resonator, capable of supporting a large number of transverse modes of oscillation driven by an associated active laser medium, is controlled by an electron beam to allow oscillation only in chosen modes, thereby controlling the angle of beam deflection or position of beam emission. A polarizer and a birefringent plate are used as a biasing light attenuator to spoil all oscillatory modes, thereby preventing oscillation. The electron beam charges selected conductive, reflecting strips which create an electrostatic field in strip-like regions of an electro-optic crystal. The field-influenced strip-like regions of the crystal are thus made birefringent to compensate for the birefringence of the plate, thereby reducing attenuation and allowing oscillation of electron-beam selected modes. External resistors to ground provide controlled leakage paths to reduce or control charge persistence in the conductive strips.

BACKGROUND OF THE INVENTION

Field of the invention

This invention relates to a device for controlling the direction in which a beam is emitted from a laser, and more particularly for electrically controlling the attenuation of a degenerate laser cavity in its various modes, thereby controlling the direction in which the cavity can sustain oscillations.

Description of the prior art

Electron beam scanlasers are known in the prior art. For example, see Pole et al., "Electron Beam Scanlaser" IEEE Journal of Quantum Electronics, vol. QE-2, No. 7, July 1966, pages 183–184, and Myers et al., "The Electron Beam Scanlaser: Theoretical and Operational Studies," IBM Journal of Research and Development, vol. 11, No. 5, September 1967, pp. 502–510.

In one prior art device, an active laser element is contained within a resonant cavity defined by two mirrors. One of the two mirrors is a conventional half-silvered mirror. The other mirror is part of a mode selector system for allowing a resonant mode only in the desired direction of lasing.

The mode selector includes a polarizer, a fixed optical retardation plate, and an electro-optic crystal having a coating of conductive, transparent material on one surface and having a continuous coating of highly reflective dielectric material on the opposite surface. A controlled electron beam is provided for placing an electric charge on selected areas of the dielectric coating.

If all parts of the mode selector mirror were to reflect light without substantial attenuation, the laser would operate as a conventional laser, oscillating in all possible modes simultaneously. However, the reflective characteristics of the mode selector mirror are ordinarily "spoiled," that is, there is so much attenuation of the reflected light that ordinarily not enough light is reflected back to the active laser element to maintain oscillations.

The spoiling is accomplished as follows. The polarizer intercepts light from the active element and passes only light polarized in a single plane. The plane polarized light passes through the fixed optical retardation plate, which has a fixed birefringent effect and is oriented so as to retard the phase of one polarization component of the light with respect to the other transmitted by it. The light enters the electro-optic crystal and is reflected by the dielectric coating to re-emerge from the electro-optic crystal. The emerging light passes again through the retardation plate where the retardation "bias" is doubled and returns to the polarizer. However, the twice retarded light has been subjected to such a phase change that it is no longer polarized the same way. Thus, it is attenuated in passing through the polarizer and emerges too weak to stimulate the active laser medium into oscillation. All modes of oscillation of the cavity have been spoiled, and there is no oscillation.

The birefringent characteristics of the electro-optic crystal are used to "un-spoil" selected modes of oscillation. When an electrostatic field is applied across an electro-optic crystal, the crystal acquires birefringent characteristics of its own. These characteristics can be used to compensate for the phase delay caused by the retardation plate, thereby unbiasing the phase of the light. Then light from the birefringent areas of the crystal can pass with less attenuation through the polarizer, thereby maintaining sufficient intensity to stimulate the laser into oscillation in at least one mode. Thus, the polarizer and the optical retardation plate have acted as a bias means to bias the polarization of the light passing through them. The electro-optic crystal overcomes this bias to unspoil one or several modes for oscillation.

In the prior art, the electrostatic field applied to the crystal for unspoiling a chosen mode is derived from a charge deposited on the dielectric coating by the controlled electron beam. This charge creates a localized electrostatic field between the dielectric coating on one surface of the crystal and the transparent, conductive coating (which is grounded) on the opposite surface. This charge is chosen to allow the cavity to be sufficiently unspoiled in one small region to maintain (ideally) a one-mode laser beam emitted from one mirror at a point optically conjugate to the position of the charge, and having a direction within the resonator controlled by the angular displacement of the unspoiled region with respect to the axis of the optical cavity.

However, there is a disadvantage to using this prior art system for unspoiling a cavity. Once a charge has been applied to a region of the dielectric coating, some time is required for the charge to leak off. This time is a function of the resistivity of the electro-optic crystal, which is not readily variable. One method for varying this resistivity is described in U.S. patent application, Ser. No. 518,369, now U.S. Pat. No. 3,445,826, filed Jan. 3, 1966, and assigned to the present assignee which, however, requires special electro-optic materials not ordinarily available. Thus, the persistence of a charged spot is a fixed value, limiting, on one hand, the use of high scanning speeds, and, on the other hand, the maintenance of a fixed deflection.

SUMMARY OF THE INVENTION

The present invention contains a mode selector having a mirror made up of many small, conducting regions, each of which is connected to ground by a separate resistor so that the charge deposited on a region by the electron beam can leak off to ground through the parallel resistance of the electro-optic crystal and the separate resistor. Adjustment of the value of the separate resistor allows control of the charge decay time. These resistors can be photo-resistors for ease of adjustment.

It is evident that if the capacitance between one small region and the transparent, conducting plane is C and the value of the parallel resistance combination is R, then the time constant of the charge on the small region is RC. Because the ohmic value of the separate resistor can be selected to be as small as desired, RC can be made very short. If the separate resistor is made variable, for example, a photo-resistor, the RC time constant can be varied.

It might be possible to create a mosaic of small, conducting regions to cover the entire surface of the electro-optic crystal and to attach a separate discharge resistor to each of these regions. However, it would be unwieldy to make all of these connections without interfering with the free passage of the electron beam to the surface of the conductive regions.

The present invention may be summarized as a scanlaser with two arrays of conductive strips, each on a separate electro-optic crystal or a separate section of one such crystal. The conductive strips are used to unspoil a path through the cavity. The optical system and the strip arrays are so arranged and oriented that each array is imaged or focused onto the other array. The image of each strip from one array crosses all of the strips in the other array, preferably at a right angle. Each of the strips has a separate resistive discharge path to ground.

Thus each strip on one array can form a resonant cavity with each strip on the other array. Only the region where the image of a given strip from one array crosses another given strip in the other array will form part of the resonant cavity common to the two strips.

By using two arrays of strips, one having $n$ strips and the other having $m$ strips, the effect of an $n \times m$ mosaic array is achieved. Furthermore, only $n+m$ grounding resistors are needed, and they can be connected to the ends of the strips, instead of the $n \times m$ resistors which would be needed for a mosaic, with their confusion of connections.

BRIEF DESCRIPTION OF THE DRAWINGS

FIG. 1 is a cross-sectional illustration of an unfolded scanlaser system according to the present invention.

FIG. 2 is a planar view of a mode-selector system for use with the scanlaser system of FIG. 1.

FIGS. 3 and 4 are planar views of mode-selectors usable with the scanlaser system of FIG. 1 for operation in polar coordinates.

DESCRIPTION OF THE PREFERRED EMBODIMENTS

Figure 5:
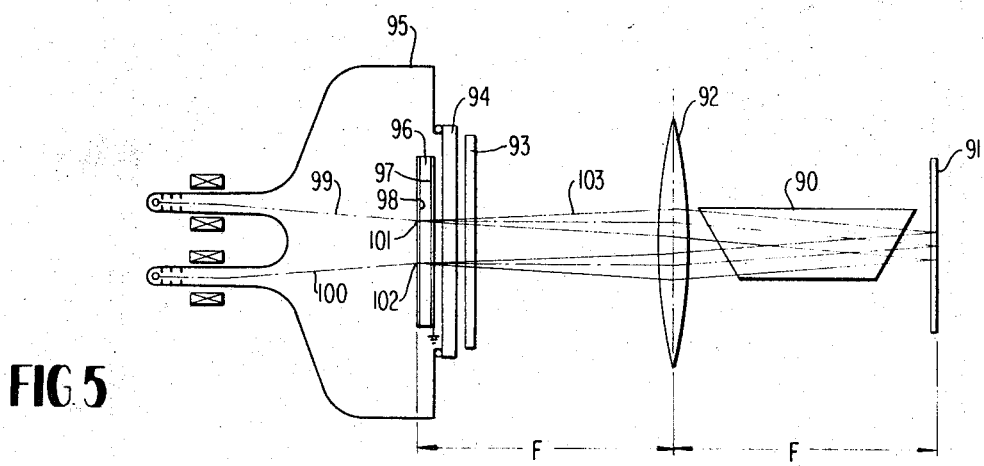
FIG. 5 is a cross-sectional illustration of a folded field scanlaser system according to the present invention.

FIG. 1 is a cross-sectional illustration of a flat-field embodiment of the electron beam addressed digital scanlaser. An active laser element 1, which may be a mercury hollow cathode discharge, is symmetrically located between two lenses 2 and 3. The active element has associated with it the usual pumping sources, etc. necessary for its proper operation, and well-known in the art but not illustrated. Symmetrically located to either side of the lenses are polarizers 4 and 5, which transmit light having, for example, an axis of polarization at 45° with respect to the vertical, as viewed from the direction of the active element. Symmetrically located on either side of the polarizers 4 and 5 are cathode ray tube systems 6 and 7.

Cathode ray tube 6 has a birefringent quartz face plate 15, which serves as a window opening to the front of the cathode ray tube, and which introduces a relative phase delay between the horizontal and vertical polarization components of light passing through the face plate. Mounted within cathode ray tube 6 behind face plate 15 is an electro-optic crystal 17, which may be KDP, i.e., $KH_2PO_4$, crystal. The electrically induced birefringent principal axes of the crystal are horizontally and vertically oriented to compensate for the birefringent effects of face plate 15. A transparent, conducting coating 18, which may be SnO or CdO, may be placed on the surface of the electro-optic crystal closest to the face plate. An array of conductive, reflecting strips 19 is placed on the back surface of the electro-optic crystal 17. Cathode 21 of cathode ray tube 6 produces an electron beam 22 which is deflected by deflection coil 23 to strike a selected area of conductive array 19.

The conductive array 19 is more fully described in connection with FIG. 2. Charge deposited by electron beam 22 on conductive array 19 creates an electrostatic field between array 19 and grounded conductive coating 18, or between the array 19 and a "virtual" ground, known to those skilled in the art, and which may usually be defined by the boundaries of the system.

Except for the orientation of conductive array 39, the components of cathode ray tube 7 are in all respects symmetrical with those of cathode ray tube 6. Lenses 2 and 3 are each located a distance F from the line of system symmetry 50. The distances F correspond to the focal lengths of the identical lenses 2 and 3. The arrays of conductive material 19 and 39 are respectively located a distance F from lenses 2 and 3. Thus, it is clear that light from array 19 forms an image on array 39, which is in the image plane of array 19. Because the device is reciprocal, array 39 is also focused onto the plane of array 19. As will be seen in connection with the discussion of later figures, a laser beam 51 is generated in a resonant cavity consisting of a point 52 on conductive array 19 and a point 53 on conductive array 39. Points 52 and 53 are points where the image of one charged conductive strip in one array crosses another charged conductive strip in the other array.

FIG. 2 is a planar view of crystal 17 and conductive strip array 18 as used in cathode ray tube 6. The array shown in FIG. 2 may also be used for elements 37 and 39 in cathode ray tube 7. Although the strip array shown in FIG. 2 may be used in both cathode ray tubes, one of the arrays must be rotated by 90° to cause the image of each of the conducting strips in one of the arrays to fall across each of the conducting strips in the other array.

A number of conducting, reflecting strips 60–69, are shown, which may be, for example, silver and are deposited on electro-optic crystal 17. Grounded resistors 70–79 are respectively connected to strips 60–69 to serve as a controlled discharge path. These resistors may be photo-conductors for ease of adjustment of RC discharge time constant. The conducting strips 60–69 may be fanned out onto a surrounding region 55, to form a larger target for the electron beam. In FIG. 2, strips 60–63 are shown as being respectively fanned out to form enlarged regions 80–83. If the resistors are photo-resistors, a light source 138 including a flash lamp 138A may be provided which is operated by pulse source 138B. The laser beam 51 may be coupled out of the cavity by a number of means, for example, a glass plate 139 located within the resonator.

Of course, there is no requirement that the strips be placed in a parallel fashion. FIGS. 3 and 4 illustrate pair of arrays useful in FIG. 1 to control the angular displacement of the laser beam according to a set of polar coordinates. A set of concentric strips in FIG. 3 and a set of radial strips in FIG. 4, when imaged on one another, will clearly control the operation of the resonant cavity according to a set of polar coordinates.

FIG. 5 is a cross-sectional view of a folded-field version of the electron-beam controlled scanlaser. A single active laser element 90 is placed to one side of the symmetry plane. A half-silvered mirror 91 is placed at the symmetry plane to reflect part of the incident light back through active laser element 90. Lens 92, polarizer 93, and quartz face plate 94 have similar construction and purpose to those illustrated in FIG. 1. Quartz face plate 94 is mounted on a dual beam cathode ray tube 95, which contains electro-optic crystal 96. This crystal may have a transparent, conductive grounded coating 97 on its front surface and two arrays 98 of conductive, reflecting strips on its back surface. These two arrays 98 are more fully described in connection with FIGS. 6 and 7. Because the embodiment of FIG. 5 is folded, with a mirror at the symmetry plane, the image of one of the arrays in plane 98 is reflected back to the same plane and is imaged on the other one of the two arrays to create a number of intersection points or regions where the image of one strip crosses a strip in the other array. Thus, when electron beams 99 and 100 respectively strike one of the two strips having intersection regions at points 101 and 102, these points 101 and 102 become able to support oscillation between them. The two points form a resonant cavity for the generation of folded laser beam 103.

Figure 6:
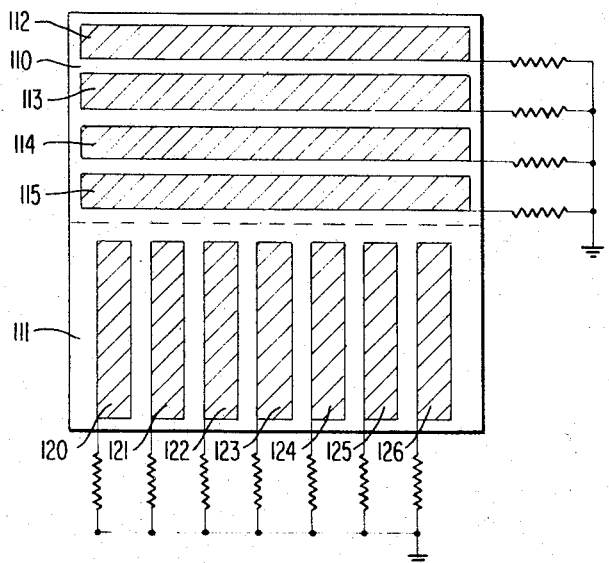
FIGS. 6 and 7 are planar and cross-sectional views of a mode-selector system for use with the scanlaser system of FIG. 5.
Figure 7:
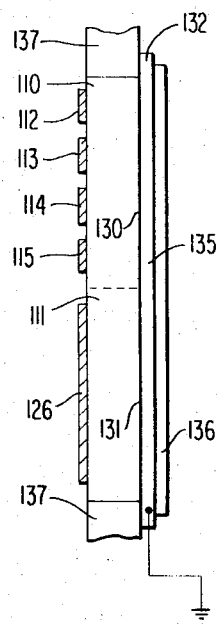

FIGS. 6 and 7 are planar and cross-sectional views of a pair of arrays of reflecting conducting strips on an electro-optic crystal which may be used in FIG. 5. FIG. 6 illustrates an electro-optic crystal having a first region 110 and a second region 111. A first plurality of reflecting conductive strips 112–115 is shown placed on a first surface area, which is the upper surface of region 110 as shown in FIG. 6. A second plurality of reflecting, conductive strips 120–126 is shown placed on a third surface area, which is the upper surface of the crystal region 111. These conducting strips are all connected to ground through separate resistors, as previously described in connection with the embodiment of FIG. 2.

FIG. 7 is a cross-sectional representation of the arrangement illustrated in FIG. 6. Surface areas 130 and 131, respectively the second surface area, located in crystal region 110 and the fourth surface area, located in crystal region 111, may be covered by a transparent, conductive electrode 135, which is connected to ground. An anti-reflective coating 136 may be placed over the transparent, conducting electrode 135. Both coatings 135 and 136 may extend over a support member 137.

Of course, it is obvious that the conductive, reflecting strips illustrated on the electro-optic crystals may be much more closely spaced than is illustrated, and that the spacing shown is for ease of illustration only. In practice, for example, FIG. 6 might represent a two-inch square KDP crystal having a series of silver strips 25 microns wide and 25 microns apart placed on its surface. Thus, the first surface area, in upper region 110 of the crystal, would have 500 longer strips on it, and the third surface area, in lower region 111 of the crystal, would have 1000 shorter strips on its surface. Each of these longer conducting strips might have a capacitance of, for example, about 0.2 picofarad. If the desired time constant of this system were about 200 nanoseconds, then the associated series resistors might each have a value of about 1 megohm. If the shorter strips had a capacitance of 0.1 picofarad, their associated resistors might have a value of 2 megohms. The entire electrode arrangement, including the leakage resistors, is probably most economically fabricated by photolithography.

While the invention has been particularly shown and described with reference to preferred embodiments thereof, it will be understood by those skilled in the art that various changes in form and details may be made therein without departing from the spirit and scope of the invention.

What is claimed is:

1. In an apparatus for controlling the direction of a laser beam, including an active element capable of generating a coherent light beam along a plurality of differently oriented paths through said active element, and cavity means defining a resonant cavity for controlling along which of said paths coherent light is generated, thereby controlling the direction of said laser beam, said cavity means comprising at least first and second reflector means, the improvement wherein:
    (a) said first reflector means comprises:
        (1) a first electro-optic crystal means having a first and a second surface areas, and
        (2) a first plurality of reflecting, conductive strips on said first surface area,
    (b) said second reflector means comprises:
        (1) a second electro-optic crystal means having a third and a fourth surface areas, and
        (2) a second plurality of reflecting, conductive strips on said third surface area,
    (c) means for placing an electrical charge on a selected strip from each of said first and second plurality of strips to create an electrostatic potential at each selected strip, and
    (d) bias means located between said active element and each of said first and second reflector means for attenuating the amount of light reflected back through said active element by each of said reflecting strips other than an electrically charged selected strip, whereby light is reflected by said electrically charged selected strips back through said active element in a relatively non-attenuated amount sufficient to cause said active element to generate a beam of coherent light along at least one of said plurality of differently oriented paths corresponding to the path of the relatively non-attenuated light.

2. An apparatus according to claim 1 wherein said means for placing an electrical charge further comprises:
    (a) means for generating first and second electron beams,
    (b) means for aiming said first electron beam to place a charge on said selected strip from said first plurality of strips, and
    (c) means for aiming said second electron beam to place a charge on said selected strip from said second plurality of strips.

3. An apparatus according to claim 2 wherein:
    (a) each strip from said first and second plurality of strips is connected through a separate resistor to a point of common potential.

4. An apparatus according to claim 3 wherein each of said separate resistors is a photoresistor, and wherein said apparatus further includes light producing means for controlling the resistance of said photoresistors.

5. An apparatus according to claim 2 wherein each strip of said first and second plurality of strips contains, in one end region thereof, a relatively wider, fanned-out area for receiving electrons from its associated electron beam.

6. An apparatus according to claim 1 further comprising:
    (a) a third reflector means for optically folding said cavity, and
    (b) said first and second reflector means being situated adjacent to each other on the side of said active element removed from said third reflector means, whereby a beam of coherent light generated between points on said first and second reflector means is folded by said third reflector means to pass through said active element in two modes.

7. An apparatus according to claim 6 wherein said third reflector means comprises a partially transparent, partially reflective mirror, whereby beams of coherent light striking said third reflector means are partially reflected to maintain oscillations in said active element and are partially transmitted to provide output beams.

8. In an apparatus for controlling the direction of a laser beam, including an active element capable of generating a coherent light beam along a plurality of differently oriented paths through said active element, and cavity means defining a resonant cavity for controlling along which of said paths coherent light is generated, thereby controlling the direction of said laser beam, said cavity means comprising at least first and second reflector means, the improvement wherein:
  (a) said first reflector means comprises:
    (1) a first electro-optic crystal means having a first and a second surface areas,
    (2) a first plurality of reflecting, conductive strips on said first surface area, and
    (3) first transparent, conductive electrode means on said second surface area,
  (b) said second reflector means comprises:
    (1) a second electro-optic crystal means having a third and a fourth surface areas,
    (2) a second plurality of reflecting, conductive strips on said third surface area, and
    (3) second transparent, conductive electrode means on said fourth surface area; and further comprising:
  (c) means for placing an electrical charge on a selected strip from each of said first and second plurality of strips to create an electrostatic field between each selected strip and its associated transparent electrode means,
  (d) bias means located between said active element and each of said first and second reflector means for attenuating the amount of light reflected back through said active element by each of said reflecting strips other than an electrically charged selected strip, whereby light is reflected by said electrically charged selected strips back through said active element in a relatively non-attenuated amount sufficient to cause said active element to generate a beam of coherent light along at least one of said plurality of differently oriented paths corresponding to the path of the relatively non-attenuated light, and
  (e) means for coupling said at least one beam of coherent light out of said cavity.

9. An apparatus according to claim 8 wherein said means for placing an electrical charge further comprises:
  (a) means for generating first and second electron beams,
  (b) means for aiming said first electron beam to place a charge on said selected strip from said first plurality of strips, and
  (c) means for aiming said second electron beam to place a charge on said selected strip from said second plurality of strips.

10. An apparatus according to claim 9 wherein:
  (a) each strip from said first and second plurality of strips is connected through a separate resistor to a point of common potential, and
  (b) said first and second transparent electrode means are directly connected to said point of common potential.

11. An apparatus according to claim 9 wherein each strip of said first and second plurality of strips contains, in one end region thereof, a relatively wider, fanned-out area for receiving electrons from its associated electron beam.

12. An apparatus according to claim 8 further comprising:
  (a) a third reflector means for optically folding said cavity, and
  (b) said first and second reflector means being situated adjacent to each other on the side of said active element removed from said third reflector means, whereby a beam of coherent light generated between points on said first and second reflector means is folded by said third reflector means to pass through said active element in two modes.

13. An apparatus according to claim 12 wherein said third reflector means comprises a partially transparent, partially reflective mirror, whereby beams of coherent light striking said third reflector means are partially reflected to maintain oscillations in said active element and are partially transmitted to provide output beams.

References Cited

Garwin: IBM Tech. Disc. Bull., vol 8, pp. 1555–6, April 1966.

Pole et al.: IEEE Jour. of Quant. Elect., vol. QE–2, pp. 182–4, July 1966.

RONALD L. WIBERT, Primary Examiner

E. BAUER, Assistant Examiner

U.S. Cl. X.R.

313—70, 91; 315—13; 350—150